US010787915B2

(12) United States Patent
Desforges et al.

(10) Patent No.: US 10,787,915 B2
(45) Date of Patent: Sep. 29, 2020

(54) MOBILE VANE FOR A TURBINE ENGINE, COMPRISING A LUG ENGAGING IN A LOCKING NOTCH OF A ROTOR DISK

(71) Applicant: SAFRAN AIRCRAFT ENGINES, Paris (FR)

(72) Inventors: Jean-Baptise Vincent Desforges, Paris (FR); Damien Bernard Quelven, Paris (FR); Maurice Guy Judet, Dammarie les Lys (FR); Ba-Phuc Tang, Cergy St. Christophe (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 342 days.

(21) Appl. No.: 15/515,195

(22) PCT Filed: Sep. 28, 2015

(86) PCT No.: PCT/FR2015/052573
§ 371 (c)(1),
(2) Date: Mar. 29, 2017

(87) PCT Pub. No.: WO2016/051054
PCT Pub. Date: Apr. 7, 2016

(65) Prior Publication Data
US 2017/0226875 A1 Aug. 10, 2017

(30) Foreign Application Priority Data
Sep. 30, 2014 (FR) .................................. 14 59278

(51) Int. Cl.
*F01D 5/30* (2006.01)
*F01D 11/00* (2006.01)
*F01D 5/32* (2006.01)

(52) U.S. Cl.
CPC ............. *F01D 5/3007* (2013.01); *F01D 5/32* (2013.01); *F01D 5/326* (2013.01); *F01D 11/006* (2013.01);
(Continued)

(58) Field of Classification Search
CPC .......... F01D 5/3007; F01D 5/32; F01D 5/326; F01D 11/006; F01D 5/30; F01D 11/00;
(Continued)

(56) References Cited

U.S. PATENT DOCUMENTS

| 3,047,268 | A | | 7/1962 | Leavitt | |
|---|---|---|---|---|---|
| 4,349,318 | A | * | 9/1982 | Libertini | ................. F01D 5/326 416/220 R |

(Continued)

FOREIGN PATENT DOCUMENTS

| EP | 1 219 782 A2 | 7/2002 |
|---|---|---|
| WO | 2009/019126 A1 | 2/2009 |

OTHER PUBLICATIONS

International Search Report dated Dec. 23, 2015 in PCT/FR2015/052573 filed Sep. 28, 2015.
(Continued)

*Primary Examiner* — Joseph J Dallo
*Assistant Examiner* — Kurt Philip Liethen
(74) *Attorney, Agent, or Firm* — Oblon, McClelland, Maier & Neustadt, L.L.P.

(57) ABSTRACT

A mobile vane for a turbine engine, including a root designed to be inserted into a receiving element of a rotor disk for a turbine engine, a platform carried by the root, and a blade extending from the platform. The platform includes an upstream edge. The upstream edge includes a lug for engaging in a locking notch of the disk in such a way as to hold the vane axially in relation to the disk, according to the longitudinal direction of the receiving element.

12 Claims, 2 Drawing Sheets

(52) U.S. Cl.
CPC ............... *F01D 5/30* (2013.01); *F01D 11/00* (2013.01); *F05D 2230/644* (2013.01); *F05D 2240/80* (2013.01); *Y02T 50/671* (2013.01); *Y02T 50/673* (2013.01)

(58) Field of Classification Search
CPC ............... Y02T 50/673; Y02T 50/671; F05D 2230/644; F05D 2240/80
See application file for complete search history.

(56) References Cited

U.S. PATENT DOCUMENTS

| | | | | |
|---|---|---|---|---|
| 5,302,086 A | * | 4/1994 | Kulesa | F01D 5/3007 416/220 R |
| 5,305,086 A | * | 4/1994 | Ishigami | H04B 1/30 329/345 |
| 5,445,499 A | * | 8/1995 | Charbonnel | F01D 5/3015 416/220 R |
| 5,501,575 A | * | 3/1996 | Eldredge | F01D 5/3015 416/144 |
| 5,662,458 A | * | 9/1997 | Owen | F01D 5/3015 416/145 |
| 8,956,119 B2 | * | 2/2015 | Chanteloup | F01D 5/326 416/193 A |
| 2002/0081205 A1 | | 6/2002 | Wong | |
| 2010/0166563 A1 | | 7/2010 | Wunderle et al. | |
| 2015/0369048 A1 | * | 12/2015 | Hough | F01D 5/10 416/219 R |

OTHER PUBLICATIONS

French Search Report dated Jul. 20, 2015 in FR 1459278 filed Sep. 30, 2014.

* cited by examiner

MOBILE VANE FOR A TURBINE ENGINE, COMPRISING A LUG ENGAGING IN A LOCKING NOTCH OF A ROTOR DISK

TECHNICAL FIELD

The invention generally relates to the technical field of aircraft turbomachines such as turbojet engines and turboprop engines. More precisely, the invention is concerned with turbomachine mobile vanes and rotor disks.

STATE OF PRIOR ART

Turbomachine mobile vanes are inserted in rotor disks, so as to form rotor wheels. These rotor wheels are part of a turbomachine compressor or a turbomachine turbine.

In a known manner, the teeth of the rotor disk have bosses in the top thereof. These bosses cooperate with cavities located under the platforms of the vanes, such that the bosses are housed in the cavities.

The mechanical cooperation of these bosses and these cavities prevents the mobile vanes from being mounted relative to the disk with the reverse orientation of the desirable orientation in aerodynamics.

Furthermore, there are rotor wheels in which mobile vanes are axially retained relative to the disk, on the one hand by a lug projecting from the disk and on the other hand by a flange.

In both solutions introduced, the radial distance between the uppermost point of the disk tooth and the uppermost point of the inner face of the platform, which is defined as the stilt height, upon operating the turbomachine, is consequently relatively significant. As a result there are significant leaks, a high mass of the vane and consequently of the disk carrying the vane, as well as intensified mechanical stresses in the disk tooth and the vane root.

On the other hand, there is a significant radial clearance between the inner face of the platform and the top of the disk teeth, which is likely to generate significant leaks.

DISCLOSURE OF THE INVENTION

The invention aims at solving at least partially problems encountered in solutions of prior art.

In this regard, the object of the invention is a mobile vane of a turbomachine, comprising:
- a root configured to be inserted in a housing of a rotor disk for a turbomachine,
- a platform carried by the root, the platform comprising an upstream rim,
- a blade extending from the platform.

According to the invention, the upstream rim comprises a lug for engaging a locking notch of the disk, so as to retain the vane relative to the disk axially along the longitudinal direction of the housing.

The locking notch and the lug promote mounting the mobile vane relative to the disk along the desirable aerodynamic orientation of the leading edge and the trailing edge. In case of an attempt to mount the mobile vane along the reverse orientation, the lug abuts against the top of the rotor disk tooth.

The locking notch and the lug simultaneously provide the above-mentioned easy mounting function, and an axial retaining function of the vane relative to the disk along the longitudinal direction.

On the other hand, the cooperation of the locking notch and the lug enables the disk tooth to be moved closer to the vane platform. The stilt height is reduced, which provides a greater compactness of the vane with a same blade. The mechanical stresses exerted in the tooth of the disk carrying the vane and in the vane root are decreased, which enables the vane mass to be decreased, and consequently also the mass of the disk carrying the vane to be decreased and ensuring the centrifugal retention of the vane.

The cooperation of the locking notch and the disk tooth also enables the trailing cross-section between two neighbouring vanes to be reduced.

Furthermore, the cooperation of the locking notch and the lug decreases the radial clearance between the platform and the top of the disk tooth, which further limits the air leaks between the disk and the platform.

By longitudinal direction of the housing, it is meant in particular the greatest length of the housing. Specially, the longitudinal direction of the housing is defined in contrast to the housing height.

The invention can optionally include one or more of the following characteristics combined to each other or not.

Advantageously, the upstream rim has substantially, in at least one longitudinal cross-section through the vane, a general U-shape opening downstream. The lug preferably forms one of the branches of the general U-shape and the upstream spoiler for example projects upstream from the bottom of the general U-shape.

The invention also relates to a disk for a compressor or turbine of a turbomachine. The disk comprises a housing in which a root of a vane as defined above is configured to be inserted.

According to the invention, the disk comprises at least one locking notch for being engaged with the lug, so as to retain the vane relative to the disk axially along the longitudinal direction of the housing.

According to an advantageous embodiment, the longitudinal direction of the housing is substantially orthogonal to a radial direction of the disk.

According to another advantageous embodiment, the longitudinal direction of the housing is substantially orthogonal locally to the circumferential direction of the disk.

The locking notch is preferably a groove extending substantially along the circumferential direction of the disk.

According to another particular embodiment, the housing extends between two consecutive teeth of the disk, the locking notch being located on only one of both these teeth.

The invention also relates to a rotor wheel comprising a disk as defined above and a mobile vane as defined above, the mobile vane for being mounted to the disk, such that the platform presses against only one tooth and that the lug engages the locking notch of the tooth.

The rotor wheel thereby forms an isostatic system. By contrast, if at least one the mobile vanes of the wheel were pressing against several teeth, the rotor wheel would be a hyperstatic system.

The invention also relates to a turbomachine module chosen from a turbine and a compressor, the module comprising a rotor wheel. The compressor is in particular a high or low pressure compressor for a turbomachine. The turbine is in particular a high or low pressure turbine for a turbomachine.

Finally, the invention relates to a turbomachine comprising a module as defined above.

BRIEF DESCRIPTION OF THE DRAWINGS

The present invention will be better understood upon reading the description of exemplary embodiments, given by way of purely indicating and in no way limiting purposes, in reference to the appended drawings in which.

DETAILED DISCLOSURE OF PARTICULAR EMBODIMENTS

Figure 1:
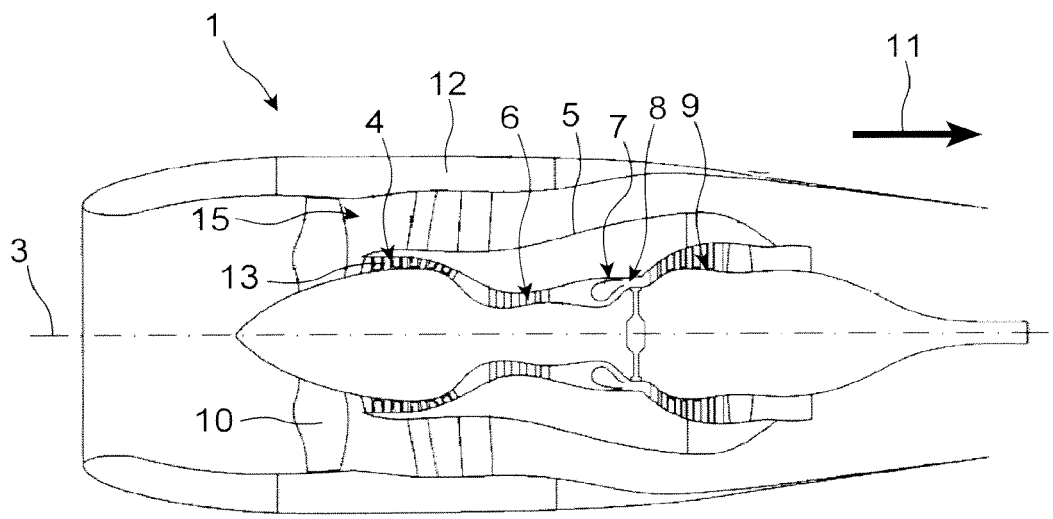
FIG. 1 represents a schematic longitudinal cross-section view of a turbomachine with double flow, according to a preferred embodiment of the invention.

Identical, similar or equivalent parts of the different figures have the same reference numerals so as to facilitate switching from one figure to the other.

FIG. 1 represents a turbomachine with double flow 1, which is annular about an axis 3 of a turbomachine.

The turbomachine 1 includes, from upstream to downstream, a low pressure compressor 4, a high pressure compressor 6, a combustion chamber 7, a high pressure turbine 8 and a low pressure turbine 9. These elements are surrounded by a case 5. They commonly define in relation with the case 5 a primary jet through which a primary flow 13 flowing from upstream to downstream passes, represented by the arrow 11. This direction 11 also corresponds to the thrust force of the turbomachine in operation.

The high pressure turbine 8 forms, together with the combustion chamber 7 and the high pressure compressor 6 integral therewith, a high pressure body. The low pressure turbine 9 is integral with the low pressure compressor 4 and the fan 10, so as to form a low pressure body. Each turbine 8, 9 drives the associated compressor 4, 6 into rotation about the axis of the turbomachine 3 under the effect of the gas thrust from the combustion chamber 7.

The turbomachine 1 is a turbomachine with double flow. Consequently, it comprises furthermore a fan 10 ducted by a nacelle 12 to generate a secondary flow 15 through a secondary jet surrounding the primary flow 13.

Figure 2:
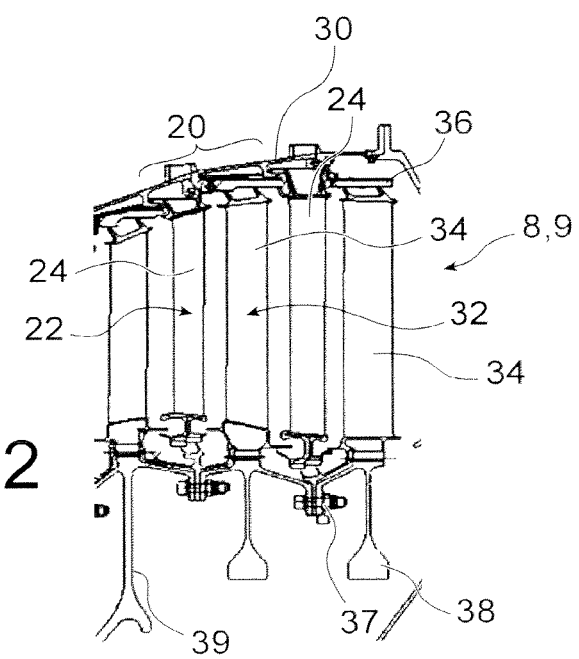
FIG. 2 is a partial schematic representation of a low pressure turbine of the turbomachine represented in FIG. 1.

In reference to FIG. 2, the turbines 8, 9 comprise a plurality of stages 20 of vanes surrounded by the case 30. Each stage 20 includes a distributor 22 formed by an annular row of fixed vanes 24, and a wheel 32 of mobile vanes 34.

The rotor wheels 32 rotate inside turbine rings 36 attached to the turbine case 30. The distributor vanes 24 are also carried by the case 30. The rotor wheels 32 comprise disks 38 mechanically connected to each other by annular attachment flanges 37. These attachment flanges 37 mechanically connect the rotor wheels 32 to a rotating shaft (not represented) of the turbomachine through a driving cone 39. The disks 38 of the rotor wheels 32 carry radial vanes 34.

Figure 3:
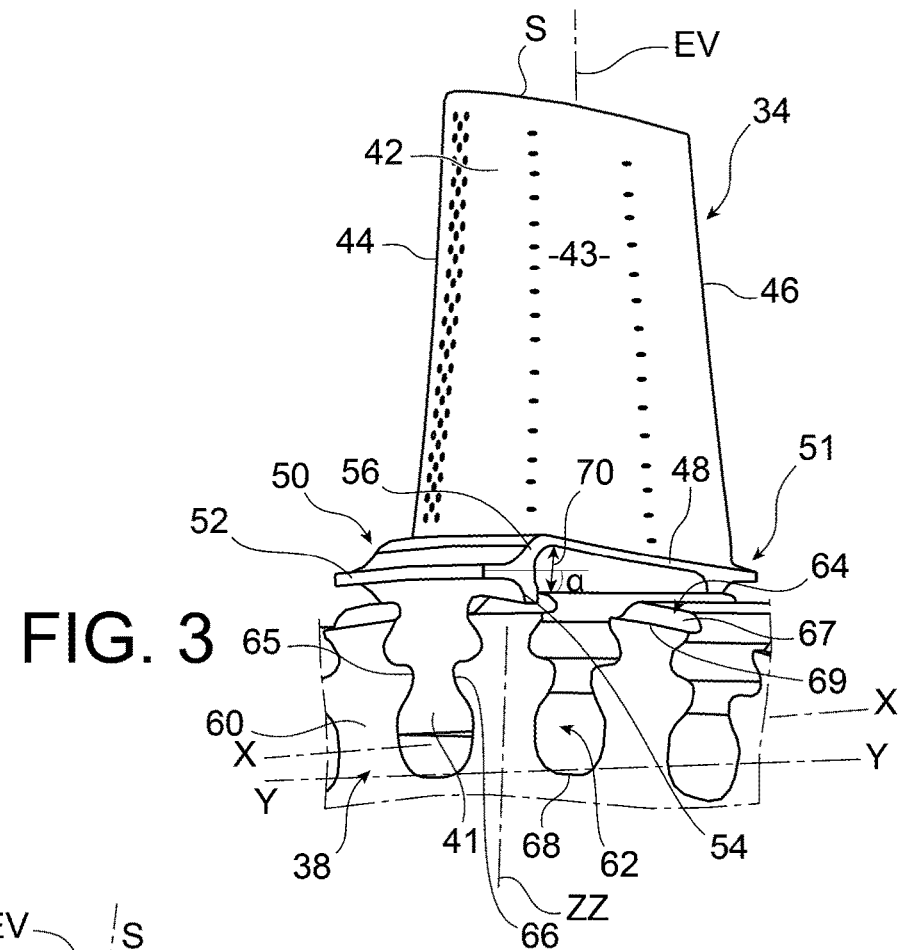
FIG. 3 is a partial perspective schematic front view of a rotor vane and of the disk on which the vane is mounted, being part of the high pressure turbine of the turbomachine of FIG. 1.

The mobile vane 34 represented in FIG. 3 is a high pressure turbine vane 8, according to a preferred embodiment. Such a mobile vane 34 comprises a root 41, a blade 42 and a platform 48 carried by the root 41. The root 41 is intended to be inserted in one of the housings 62 of a turbine rotor disk 38 such as that represented in FIG. 2, or in a compressor rotor disk 4, 6 of the turbomachine represented in FIG. 1.

Figure 4:
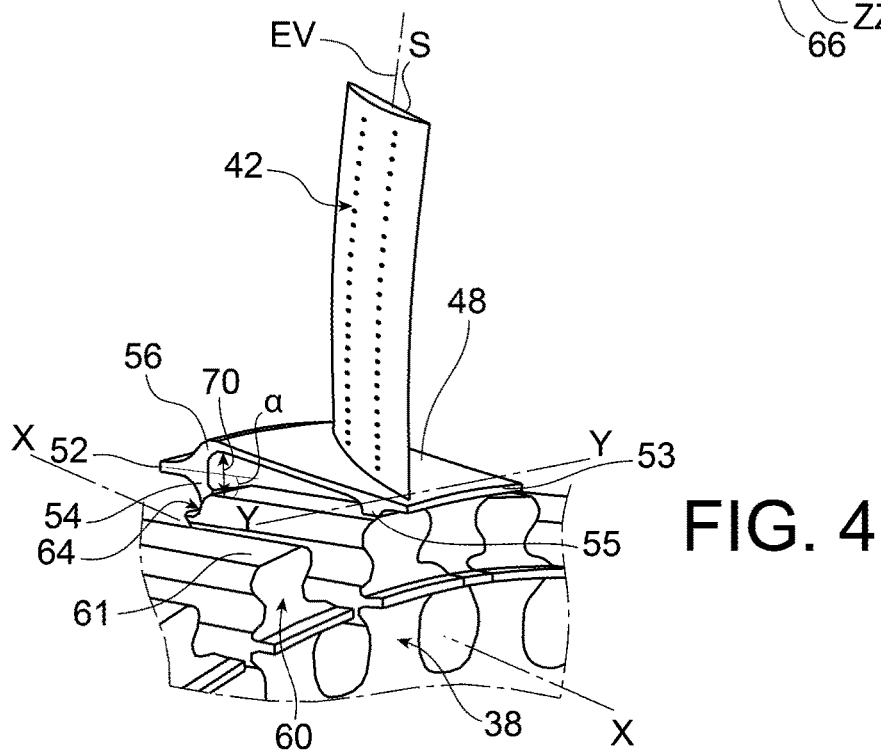
FIG. 4 is a partial perspective schematic back view of the vane and the disk represented in FIG. 3.

In reference to FIGS. 3 and 4, the rotor disk 38 includes a plurality of teeth 60 spaced along the circumference of the disk 38 by housings 62 in which the root 41 of the mobile vane 34 is accommodated. As such, it should be noted that the disk 38 carries several mobile vanes 34, even if the FIGS. 3 and 4 only represent one mobile vane 34.

The housings 62 are in the form of elongate cells and passing through the disk 38 on either side. These cells are of shapes at least partially complementary to that of the root 41. The shape of the housings 62 is chosen so as to provide retention of the vanes 34 which are subjected to a significant centrifugal strain upon operating the turbomachine 1.

These housings 62 are located between consecutive teeth 60 of the disk 38. They extend both along a longitudinal direction XX and along the radial direction ZZ of the disk corresponding to the height direction of the teeth 60. The longitudinal direction XX is substantially orthogonal to the radial direction ZZ. On the other hand, the longitudinal direction XX is preferably substantially orthogonal to the circumferential direction YY of the disk 38, at the teeth 60 delimiting the housing 62.

These housings 62 are each delimited by a bottom 68 located remotely from the root 41 and by two opposite surfaces 65, 66 each present on one of both consecutive teeth delimiting the housing 62. The root 41 presses against both opposite surfaces 65, 66.

Further, the teeth 60 of the disk 38 each comprise a locking notch 64 for cooperating with the lug 54 of the platform 48, to retain the mobile vane 34 relative to the disk 38 along the longitudinal direction XX. Each locking notch 64 only cooperates with one lug 54 and each lug 54 only penetrates inside one locking notch 64. The rotor wheel 32, comprising the mobile vanes 34 and the disk 38, then forms an isostatic system.

The locking notch 64 and the lug 54 are only located upstream of the mobile vane 34. The axial retention of the mobile vane 34 along the longitudinal direction XX upstream of the vane 34 is ensured by an insert (not represented).

The locking notch 64 is a groove which extends along the circumferential direction YY of the disk. It is for example cut into the tooth 60, so as to be delimited by a first wall 67 and a second wall 69 which can be substantially orthogonal to each other. Alternatively, the first wall 67 can have a tilt different relative to the second wall 69.

The mobile vane 34 presses against the disk 38, upon operating the turbomachine 1, only at the locking notch 64 and the housing 62, the root 41 of which at least partially fits the shape.

The blade 42 extends from the platform 48 along a span direction EV terminating with a top S. This span direction EV substantially corresponds to the radial direction ZZ of the disk 38 and to the radial direction of the turbomachine 1. It is substantially orthogonal to the axis 3 of the turbomachine.

The blade 42 comprises a leading edge 44 and a trailing edge 46.

The leading edge 44 is located at upstream of the vane and has generally domed shape. The trailing edge 46 is oriented nearly in parallel to the leading edge 44 upstream of the blade 42. The trailing edge 46 has generally a more tapered shape than the leading edge 44.

The leading edge 44 and the trailing edge 46 are joined sideways by a pressure side wall 43 and a suction side wall (not represented) opposite to the pressure side wall 43.

The platform 48 is configured to press against the rotor disk 38. Upstream of the platform 48 there is an upstream rim 50. Downstream of the platform 48, there is a downstream rim 51. The platform 48 presses against one of the teeth 60 of the disk 38 at the upstream rim 50, and has a low radial clearance with respect to the teeth 60 of the disk 38 at the upstream rim 50 and the downstream rim 51.

The upstream rim 50 and the downstream rim 51 also play the role of stiffeners for the vane 34, in that they enable mechanical deformations of the vane 34 to be limited upon operating the turbomachine 1.

The upstream rim 50 comprises an upstream spoiler 52, a lug 54 and a connecting portion 56 ensuring the junction between the upstream rim 50 and the rest of the platform 48. The upstream rim 50 has substantially, in a longitudinal cross-section plane of the vane 34 passing through the span direction EV and the longitudinal direction XX, a downstream opening general U-shape. The connecting portion 56 and the lug 54 form the two branches of the general U-shape. The upstream spoiler 52 extends upstream from the bottom of the general U-shape which joins the connecting portion 56 and the lug 54.

The upstream spoiler 52 aims at improving the aerodynamic performance of the mobile vane 34, by bringing air in proximity to the upstream of the platform 48 to the leading edge 44. This upstream spoiler 52 also ensures a covering function with the distributor 22 located upstream of the vane 34.

The downstream rim 51 includes a downstream spoiler 53 and a downstream projecting portion 55 which forms the downstream stiffener. The downstream spoiler 53 extends from the primary jet and ensures a covering function.

The lug 54 projects from the platform 48 to the rotor disk 38 and downstream from the mobile vane 34. It is designed to engage the locking notch 64 of the disk 38, such that the lug 54 and the locking notch 64 retain the mobile vane 34 along the longitudinal direction XX.

The lug 54 is only present on one of the sides of the upstream rim 50. In other words, the lug 54 makes the mobile vane 34 unsymmetric with respect to a cross-section plane passing through a median plane of the mobile vane 34 comprising the span direction EV and the longitudinal direction XX. Each mobile vane 34 comprises a single lug 54 configured to cooperate with the locking notch 64 of one of the teeth 60.

In operation, the primary flow flows along the mobile vane 34 from the leading edge 44 to the trailing edge 46 by running along the pressure side 43 and the suction side.

The cooperation of the locking notch 64 and the lug 54 enables a proper mounting of the mobile vane 34 to the disk 38 to be ensured. Indeed, in case of an attempt to mount in the reverse direction, that is by inverting the leading edge 44 and the trailing edge 46 of the mobile vane 34 with respect to the rotor disk 38, the lug 54 would abut against the top 61 of the tooth, which would prevent the mobile vane 34 from being inserted into its housing 62.

The locking notch 64 and the lug 54 lower the upstream fulcrum of the mobile vane 34 against the disk 38, which results in a limited stilt height 70. Consequently, the mass and the size both of the root 41 and the platform 48 are lowered with respect to a conventional technology. As a result, the overall mass of the mobile vanes 42 is lower, and consequently the mass of the disks 38 is lower than in a conventional technology.

Finally, the radial clearance 70 between the middle of the platform 48 along the longitudinal direction XX and the top 61 of the tooth 60 is lower than in a conventional turbomachine. Thereby, there is a decrease in the air leaks.

In conclusion, the cooperation between the locking notch 64 and the lug 54 is likely to ensure at the same time a greater compactness of the rotor wheel 32 with a same length of the blade 42, to reduce the mass of the rotor wheel 32, to limit air leaks between the disk 38 and the mobile vanes 34, and to promote mounting of the mobile vanes 34 to the rotor disk 38 without reverting the mounting direction of the mobile vane 34 relative to the disk 38.

Of course, various modifications can be made by those skilled in the art to the invention just described without departing from the scope of the disclosure of the invention.

The invention claimed is:

1. A mobile vane of a turbomachine, comprising:
   a root configured to be inserted in a housing of a rotor disk for a turbomachine,
   a platform carried by a top surface of the root, the platform comprising an upstream rim, and
   a blade extending from a top surface of the platform such that the platform is disposed between the root and the blade,
   wherein the upstream rim of the platform comprises a lug for engaging a locking notch of the disk, so as to retain the vane relative to the disk axially downstream along a longitudinal direction of the housing.

2. A disk for a compressor or turbine of a turbomachine, the disk comprising a housing in which a root of a vane according to claim 1 is configured to be inserted,
   wherein the disk comprises at least one locking notch for being engaged with the lug, so as to retain the vane relative to the disk axially downstream along the longitudinal direction of the housing.

3. The disk according to claim 2, wherein the longitudinal direction of the housing is substantially orthogonal to a radial direction of the disk.

4. The disk according to claim 2, wherein the longitudinal direction of the housing is substantially orthogonal to a tangential direction of the disk.

5. The disk according to claim 2, wherein the locking notch of the disk is a groove substantially extending along a tangential direction of the disk.

6. The disk according to claim 2, wherein the housing extends between two consecutive teeth of the disk, the locking notch being located on only one of both teeth.

7. The mobile vane according to claim 1, wherein the upstream rim includes an upstream spoiler, the lug, and a connection portion which presents a junction between the upstream rim and a remainder of the platform,
   wherein the upstream rim presents a downstream opening general U-shape in a longitudinal cross-section plane of the vane in which the lug and the connection portion form branches of the general U-shape, and
   wherein the upstream spoiler extends upstream from a bottom of the general U-shape.

8. The mobile vane according to claim 1, wherein the lug is only present on one side of the upstream rim such that the mobile vane is unsymmetric with respect to a cross-section plane passing through a median plane of the mobile vane comprising a span direction and the longitudinal direction.

9. The mobile vane according to claim 1, wherein a lower free end surface of the lug is above a bottom surface of the root.

10. A rotor wheel comprising;
    a disk comprising a housing; and
    a mobile vane comprising:
      a root configured to be inserted in the housing of the disk,
      a platform carried by a top surface of the root, the platform comprising an upstream rim,
      a blade extending from a top surface of the platform such that the platform is disposed between the root and the blade, wherein the upstream rim comprises a lug for engaging a locking notch of the disk, so as to retain the vane relative to the disk axially downstream along a longitudinal direction of the housing, wherein the disk is a disk for a compressor or turbine of a turbomachine, wherein the disk comprises a locking notch for being engaged with the lug so as to retain the vane relative to the disk axially downstream along the longitudinal direction of the housing, and wherein the mobile vane is configured to be mounted to the disk such that the platform presses against only one tooth and that the lug engages the locking notch of the tooth.

11. A turbomachine module chosen from a turbine and a compressor, the module comprising a rotor wheel according to claim 10.

12. A turbomachine comprising a module according to claim 11.

* * * * *